(12) United States Patent
Giustiniano et al.

(10) Patent No.: US 8,873,965 B2
(45) Date of Patent: Oct. 28, 2014

(54) VISIBLE LIGHT COMMUNICATION WITH FLICKERING PREVENTION

(75) Inventors: Domenico Giustiniano, Zurich (CH); Stefan Mangold, Liebefeld (CH); Nils Ole Tippenhauer, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 115 days.

(21) Appl. No.: 13/443,785

(22) Filed: Apr. 10, 2012

(65) Prior Publication Data

US 2013/0266325 A1 Oct. 10, 2013

(51) Int. Cl.
*H04B 10/11* (2013.01)
*H04B 10/116* (2013.01)
*H04B 10/50* (2013.01)

(52) U.S. Cl.
USPC ............................. 398/118; 398/172; 398/182

(58) Field of Classification Search
USPC ........................ 398/172, 118–131, 182–183
See application file for complete search history.

(56) References Cited

U.S. PATENT DOCUMENTS

| | | | | |
|---|---|---|---|---|
| 5,822,373 A * | 10/1998 | Addy | ............................. | 375/259 |
| 5,995,253 A * | 11/1999 | Flaherty | .......................... | 398/36 |
| 6,548,967 B1 * | 4/2003 | Dowling et al. | ............... | 315/318 |
| 7,072,587 B2 * | 7/2006 | Dietz et al. | ..................... | 398/138 |
| 7,689,130 B2 * | 3/2010 | Ashdown | ...................... | 398/172 |
| 8,107,825 B2 * | 1/2012 | Rajagopal et al. | ............ | 398/172 |
| 8,165,472 B2 * | 4/2012 | Takene et al. | .................. | 398/172 |
| 8,253,353 B2 * | 8/2012 | Baggen et al. | ................. | 315/308 |
| 8,401,394 B2 * | 3/2013 | Walewski | ...................... | 398/130 |
| 8,447,189 B2 * | 5/2013 | Kim et al. | ...................... | 398/172 |
| 8,588,616 B2 * | 11/2013 | Langer et al. | .................. | 398/118 |
| 8,744,273 B2 * | 6/2014 | Riedl et al. | ..................... | 398/183 |
| 2004/0208632 A1 * | 10/2004 | Dietz et al. | ..................... | 398/182 |
| 2008/0063410 A1 | 3/2008 | Irie | | |
| 2009/0110405 A1 * | 4/2009 | Lee et al. | ....................... | 398/130 |
| 2009/0196613 A1 * | 8/2009 | Linnartz | .......................... | 398/78 |
| 2009/0214225 A1 * | 8/2009 | Nakagawa et al. | ........... | 398/191 |
| 2009/0297166 A1 * | 12/2009 | Nakagawa et al. | ........... | 398/172 |
| 2010/0135669 A1 * | 6/2010 | Kim et al. | ...................... | 398/130 |
| 2010/0135671 A1 * | 6/2010 | Park et al. | ...................... | 398/172 |
| 2010/0254712 A1 * | 10/2010 | Linnartz et al. | ............... | 398/172 |

(Continued)

OTHER PUBLICATIONS

Standards, IEEE Standards for Local Area Networks Carrier Sense Multiple Access With Collision Detection (CSMACD) Access Method and Physical Layer Specifications, Dec. 2002, Computer Society, All Document.*

(Continued)

*Primary Examiner* — Ken Vanderpuye
*Assistant Examiner* — Dibson Sanchez
(74) *Attorney, Agent, or Firm* — Patterson & Sheridan, LLP

(57) ABSTRACT

LEDs that transmit or receive data in a VLC may create a flickering effect which is observed when the human eye is able to perceive the fluctuations of the light intensity in a LED. To prevent flickering, the LEDs may emit light based on a pattern of data and energy intervals. During the data intervals, a LED transmitting a message sends one or more data symbols to receiving LEDs. The receiving LEDs, however, are reversed bias and do not emit light. During the energy intervals, any LED in the VLC system may emit light. Each LED uses the energy interval to compensate for the light transmitted (or not transmitted) during the data interval. The combination of data and energy levels results in an observer seeing light with a constant intensity rather than changing intensity.

20 Claims, 8 Drawing Sheets

(56) References Cited

U.S. PATENT DOCUMENTS

| | | | |
|---|---|---|---|
| 2010/0284697 A1* | 11/2010 | Bae et al. | 398/130 |
| 2010/0302268 A1* | 12/2010 | Jun et al. | 345/589 |
| 2010/0327764 A1* | 12/2010 | Knapp | 315/250 |
| 2011/0064405 A1 | 3/2011 | Rajagopal et al. | |
| 2012/0001567 A1* | 1/2012 | Knapp et al. | 315/291 |
| 2012/0045221 A1* | 2/2012 | Walewski | 398/191 |
| 2012/0087676 A1* | 4/2012 | Lim et al. | 398/182 |
| 2012/0170693 A1* | 7/2012 | Hung et al. | 375/342 |

OTHER PUBLICATIONS

Schmid, Stefan et al., Networking Smart Toys with Wireless ToyBridge and ToyTalk, The 30th IEEE International Conference on Computer Communications, Apr. 2011, IEEE, Piscataway, New Jersey, United States.

Dietz, Paul et al, Very Low-Cost Sensing and Communication Using Bidirectional LEDs, Jul. 2003, Mitsubishi Electric Research Laboratories, Inc., Cambridge, Massachusetts, United States.

Institute of Electrical and Electronics Engineers, IEEE Standard for Information technology—Telecommunications and information exchange between systems—Local and metropolitan area networks—Specific requirements —, 2009, IEEE, Piscataway, New Jersey, United States.

Rajagopal, Sridhar et al., IEEE 802.15.7 Visible Light Communication: Modulation Schemes and Dimming Support, IEEE Communications Magazine, Mar. 2012, vol. 50, Issue 3, IEEE, Piscataway, United States.

Tippenhauer, Nils Ole et al., Toys communicating with LEDs: Enabling Toy Cars Interaction, Consumer Communications and Networking, 2012, pp. 48-49, IEEE, Piscataway, United States.

* cited by examiner

VISIBLE LIGHT COMMUNICATION WITH FLICKERING PREVENTION

BACKGROUND

1. Field of the Invention

Embodiments presented in this disclosure generally relate to transmitting data using light-emitting diodes (LEDs) in a visible light communication (VLC) channel.

2. Description of the Related Art

VLC is an emerging technology in which light emitters transmit information wirelessly, using the visible light spectrum. VLC enables the interaction of consumer products such as toys and fashion in an efficient and low-cost manner. By applying VLC, devices can communicate with each other or with displays, light bulbs, camera sensors, projectors, and many other ambient light sources.

VLC is a potential low-power, low-cost alternative to traditional short-range wireless RF communications. Electronic emitters of visible light are omnipresent in a variety of applications such as televisions, displays, status indicators, and user interfaces on consumer electronic devices. In many cases, LEDs have become the preferred light source for VLC because of their low cost, low energy consumptions, and small size. LEDs can control the brightness at a frequency that is orders of magnitude higher than conventional light emitting devices. By varying the intensity of the LED light source, data messages can be communicated through visible light to a receiver that is sensitive to light.

SUMMARY

One embodiment presented in this disclosure includes a method comprising selecting a first intensity level of a light source for transmitting a data symbol to a receiver during a data interval and selecting a second, different intensity level of the light source based upon the first intensity level to achieve a perceived average intensity level. The method also comprises emitting the first intensity level from the light source during the data interval and emitting the second intensity level from the light source during an energy interval to achieve the perceived average intensity level where the receiver is configured to ignore the second intensity level emitted during the energy interval. Moreover, respective time periods of both the data and energy intervals are set to mitigate an ability of a human eye to detect a change from the first intensity level emitted in the data interval to the second intensity level emitted in the energy interval.

Another embodiment includes a system comprising a light source and a controller coupled to the light source. The controller is configured to select a first intensity level of a light source for transmitting a data symbol to a receiver during a data interval. The controller is configured to select a second, different intensity level of the light source based upon the first intensity level to achieve a perceived average intensity level. The light source is configured to emit the first intensity level during the data interval and emit the second intensity level during an energy interval to achieve the perceived average intensity level, where the receiver ignores the second intensity level emitted during the energy interval. Moreover, respective time periods of both the data and energy intervals are set to mitigate an ability of a human eye to detect a change from the first intensity level emitted in the data interval to the second intensity level emitted in the energy interval.

Another embodiment includes a method comprising establishing an optical communication channel between a first semiconductor light source and a second semiconductor light source according to a predetermined interval pattern comprising at least one data interval and at least energy interval. The method comprising detecting incident light by reverse biasing the first semiconductor light source during the data interval and selecting an intensity level of the first semiconductor light source to achieve a perceived average intensity level, where the perceived average intensity level is an average of the light emitted by the first semiconductor light source during the data and energy intervals. The method also comprises emitting the intensity level by forward biasing first the semiconductor light source during the energy interval to achieve the perceived average intensity level. The method comprises repeating the interval pattern to maintain the average intensity level. Moreover, respective time periods of both the data and energy intervals are set to mitigate an ability of a human eye to detect a change from the first intensity level emitted in the data interval to the second intensity level emitted in the energy interval.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
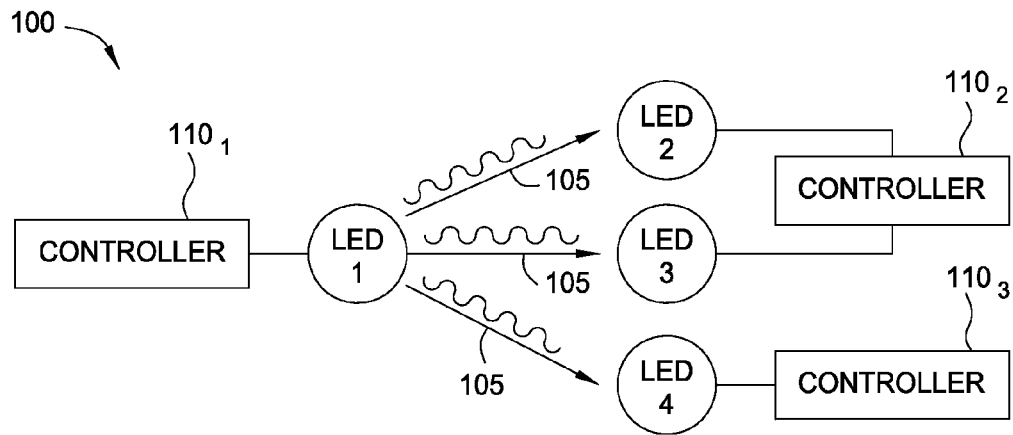
FIG. 1 is a VLC system comprising LEDs, according to one embodiment described herein.

A VLC system may use semiconductor light sources (e.g., LEDs) to both transmit and receive data messages. When a LED is transmitting data, an associated controller provides a forward bias. Additionally, the LED may be used as a receiver if a reverse bias is applied. In this manner, a single LED may be used for bi-directional communication in a wireless system.

In one embodiment, the VLC system may require a LED to wait until a time has expired before transmitting a message (i.e., a data frame) to another LED in the system. Because the VLC system may be an ad hoc wireless system, the random timer reduces the likelihood of a collision and forces the LEDs to share an optical channel by requiring the LEDs to wait until the timer expires before a message can be transmitted. Moreover, the beginning of a message may include one or more synchronization patterns to synchronize the clocks of the receiving LEDs to the clock of the transmitting LED.

Light sources that transmit or receive data in a VLC system may emit light that flickers. Flickering is observed when the human eye is able to perceive the fluctuations in the intensity of light emitted by a light source. The intensity of the light may change because the light source is transmitting a message or because the LED light source switches between reverse bias (i.e., no light is emitted) and forward bias (i.e., light is emitted).

To prevent flicker, the light sources may emit light based on a pattern of data and energy intervals. During the data intervals, a light source that is transmitting a message sends one or more data symbols to a receiver—e.g., a reverse biased LED. During this interval, the reversed biased LEDs do not emit light. During the energy intervals, however, any light source in the VLC system may emit light. Each light source uses the energy interval to compensate for the light transmitted (or not transmitted) during the data interval. For example, a transmitting LED that emitted light at a high intensity during a data interval may transmit low intensity light during an energy interval. A receiving LED, however, does not transmit light during the data interval, and thus, may transmit high intensity light during the energy interval. So long as the time period for the data and energy intervals is too short for the human eye to see the changing intensity, an observer perceives that both the transmitting and receiving LEDs are transmitting a light with a constant intensity.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A VLC System

FIG. 1 is a VLC system comprising LEDs, according to one embodiment described herein. Specifically, LED 1 performs VLC by transmitting data using visible light as shown by arrows 105. Although specific reference is made herein to LEDs, the embodiments disclosed herein may be used with any light source capable of VLC. For example, the light source may be a semiconductor light source that emits visible light of a particular wavelength (i.e., a particular color) or a light source that emits visible light comprising a combination of different wavelengths (i.e., white light). Moreover, the term "visible light" corresponds to electromagnetic radiation that is can be detected by the human eye—i.e., electromagnetic radiation with a wavelength of approximately 390 to 750 nm in the electromagnetic spectrum.

Each LED is associated with at least one controller 110$_{1-3}$ (e.g., a microprocessor). The controllers 110 may include a current or voltage source for driving the LEDs 1-4. For example, the controllers 110 may modulate the emitted light from a high intensity to a low intensity to transmit a digital signal. Specifically, on-off keying (OOK) may be used where low intensity represents one logical bit and high intensity represents a different logical bit. However, this disclosure is not limited to any particular type of modulation schema.

Each LED may be co-located on, for example, a garment, toy, device, or light fixture, as its associated controller 110. Thus, LED 1 is located on the same object as controller 110$_1$, LEDs 2 and 3 are located on the same object as controller 110$_2$ and LED 4 is located on the same object as controller 110$_3$. Further, LEDs 2-4 (and their controllers 110$_{2,3}$) may be co-located on the same object while LED 1 may be located on a different object. Accordingly, in order to communicate between objects, the controllers 110 use one of their associated LEDs to transmit data using VLC.

In system 100, the LEDs may be used as both receivers and transmitters (i.e., each LED is capable of bi-directional communication). That is, at the time shown in FIG. 1, LED 1 transmits data while LEDs 2-4 detect the transmitted data, but at a different time, LED 2 may transmit data while LEDs 1, 3, and 4 receive the transmitted data. Advantageously, using LEDs to both transmit and receive data obviates the need for a separate photodiode to detect transmitted data.

LEDs offer other advantages over using photodiodes besides simplifying the system 100. LEDs are wavelength selective in reception with a sensitivity region that is slightly wider than the LED's spectral emission profile. Thus, a LED that is currently detecting incident light may be considered as a special type of photodiode. Generally, an LED is sensitive to wavelengths equal to or shorter than the predominant wavelength it emits. For example, a green LED is sensitive to blue light and to some portion of green light but not to yellow or red light. Accordingly, a system that uses LEDs as receivers may need less optical filters (or no optical filtering) compared to VLC systems that use different light sources. This characteristic means LEDs inherently filter out (i.e., ignore) incident light outside of their sensitivity region, and thus, ambient light (e.g., sunshine) that causes interference in a VLC system may have less of an effect on a LED than a typical photodiode that indiscriminately detects a wide spectrum of visible light.

Moreover, using light sources with a limited sensitivity region permits the VLC system 100 to be divided into different optical channels based on wavelength. For example, assume that LEDs 1 and 2 are sensitive to only violet light (i.e., 380-450 nm wavelength) while LEDs 3 and 4 are sensitive to only red light (i.e., 620 nm-750 nm wavelength). LED 1 may transmit data to LED 2 in parallel with LED 3 transmitting data to LED 4 even if the light emitted by LED 1 and 3 strikes LED 2 and 4. Because LED 2 is insensitive to red light and LED 4 is insensitive to violet light, the associated controllers 110$_{2,3}$ cannot detect the data transmitted in a different optical channel.

Figure 2A:
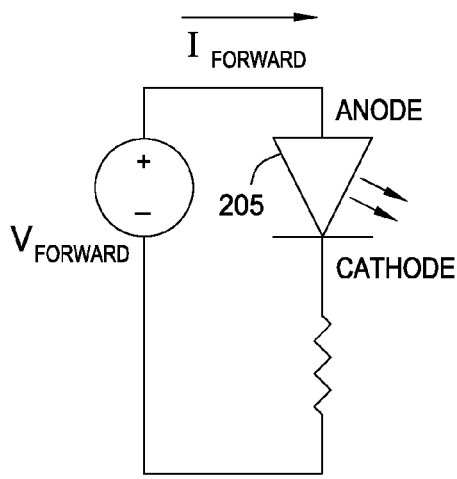
FIGS. 2A-2B are circuit models of forward and reverse biased LEDs, according to embodiments described herein.
Figure 2B:
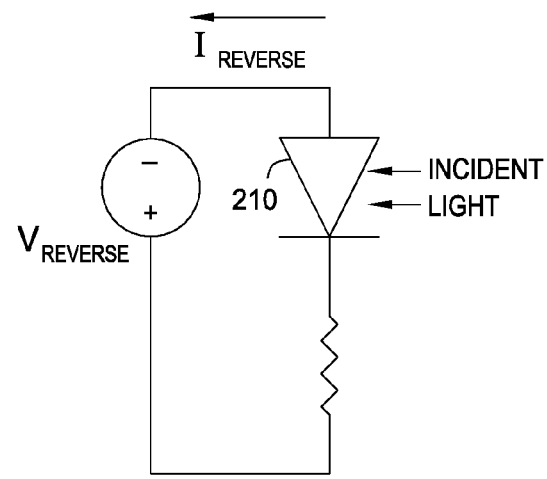

FIGS. 2A-2B are circuit models of forward and reverse biased LEDs, according to embodiments described herein. As shown, FIG. 2A illustrates a circuit model of a forward biased LED. The voltage supply ($V_{FORWARD}$) forward biases the diode 205 (e.g., a P-N junction) such that current ($I_{FORWARD}$) flows from the anode to the cathode. As a result of this bias, charge carriers combine and release energy in the form of a photon which has a particular wavelength (i.e., color).

If the OOK modulation schema is used, forward biasing the diode 205 may correspond to transmitting a logical 1. When the voltage source does not apply any voltage bias to the diode 205 (i.e., no current flows in the LED), no light is emitted. This may correspond to a logical 0. Alternatively, the voltage source may use two different voltages to forward bias the diode, thereby generating two different levels of intensity transmitted by the diode 205. The greater level of intensity may correspond to a logical 1 while the lesser level of intensity may correspond to a logical 0, or vice versa.

FIG. 2B illustrates a circuit model of a reverse biased LED. Here, the polarity of the voltage source is reversed ($V_{REVERSE}$) which causes the P-N junction of the diode 210 to also be reversed. A small current ($I_{REVERSE}$) results which flows in the opposite direction of $I_{FORWARD}$. Typically, $I_{FORWARD}$ is a few mA while $I_{REVERSE}$ is only a few pA (also called a dark current). Because $I_{REVERSE}$ is so small, any incident light (i.e., photons) with a wavelength in the sensitivity region of the LED that strikes the depletion region of the P-N junction may significantly increase $I_{REVERSE}$ (e.g., doubling or tripling its value. Specifically, the incident light generates additional charge-carriers in the depletion region which may be swept out of the depletion region by the internal electrical field, thereby increasing the current flowing in the LED—i.e., increasing $I_{REVERSE}$. A controller can detect this change in $I_{REVERSE}$ and thus determine the intensity of the incident light.

In one embodiment, the change in $I_{REVERSE}$ may be directly measured by a controller 110 to determine the intensity of the light. However, measuring the difference between such small currents (e.g., 1 pA versus 2 pA) may be impossible for a typical analog to digital converter (ADC) pin of a microcontroller. Instead of using more expensive or bulky equipment, a capacitor may be used to determine the incident light intensity.

Figure 3:
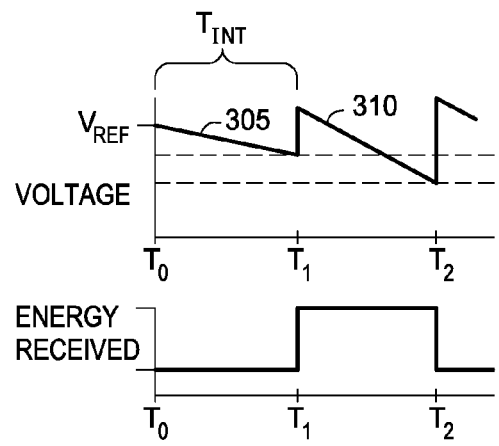
FIG. 3 is a timing diagram of discharging a capacitance associated with an LED, according to an embodiment described herein.

FIG. 3 is a timing diagram of discharging a capacitance associated with an LED, according to an embodiment described herein. Before measuring the incident light, a capacitor is charged to a reference voltage ($V_{REF}$). Then, the capacitor is permitted to discharge when the LED is reversed biased as shown in FIG. 2B. At the end of some integration period ($T_{INT}$), the remaining charge or voltage of the capacitor is measured by the ADC pin on a controller.

In one embodiment, instead of using a separate capacitor, the internal capacitance of a reverse biased P-N junction in the LED may be used. As discussed previously, incident light increases $I_{REVERSE}$, and thus, increases the rate at which the capacitance associated with an LED discharges.

FIG. 3 illustrates two time periods of length $T_{INT}$ during which the LED is reversed biased. From $T_0$ to $T_1$ (e.g., a time period similar to the data symbol period) the LED is not struck by incident light, and thus, no additional energy is added to the LED. Line 305 illustrates the rate at while the voltage (or charge) across the capacitor decreases during this time period. At $T_1$, the capacitance is recharged to $V_{REF}$. During the time period from $T_1$ to $T_2$, however, incident light does strike the depletion region of the LED which increases $I_{REVERSE}$. As shown by line 310, the additional current discharges the capacitor more quickly than during $T_0$ to $T_1$ and results in a steeper slope than the slope associated with line 305. At the end of each time interval, the controller can measure the voltage. If the voltage is, for example, above a predefined threshold voltage, then the controller determines that a logical 0 was received; if below the threshold, then the controller determines that a logical 1 was received. Because the measured voltage may be between 0-5 V, an ADC pin on a typical microcontroller may be capable of detecting which bit was received in the time interval without the need of more expensive or additional equipment.

Synchronizing a VLC System

FIGS. 4A-4D are timing diagrams for synchronizing clocks associated with two LEDs, according to embodiments described herein. Specifically, FIGS. 4A-4D show timing diagrams for synchronizing the clocks associated with LEDs 2-4 to the clock of LED 1. Before data is transmitted from LED 1 to LEDs 2-4, their respective clocks are synchronized so they sample the data at the correct time. Additionally, each LED (or controller 110) is preconfigured to use the same time period (T) when transmitting and receiving a signal. For reasons that will be discussed later, in one embodiment, the length of the period T for transmitting a single data symbol or bit is less than or equal to 3 ms.

Figure 4A:
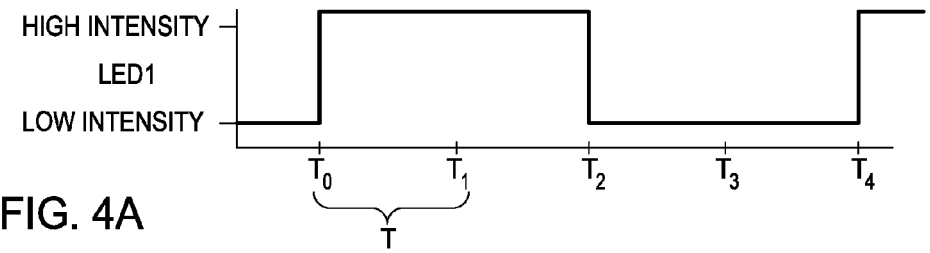
FIGS. 4A-4D are timing diagrams for synchronizing clocks associated with two LEDs, according to embodiments described herein.

Before data is transmitted in the VLC system, one of the LED transmits a synchronization pattern to ensure any LEDs within transmission distance are sampling data at the correct time. For example, as shown in FIG. 4A, LED 1 transmits the synchronization bit pattern "0110". The LEDs 2-4 may be reversed biased during certain time periods to monitor the channel and determine whether a synchronization signal is being sent.

In one embodiment, the VLC system is placed into a synchronization mode by one or more users. Alternatively, the VLC system is automatically placed into a sync mode at startup.

Figure 4B:
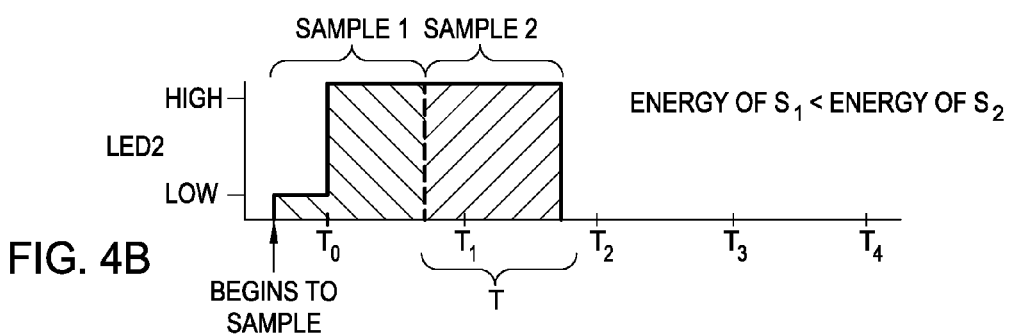
Figure 4C:
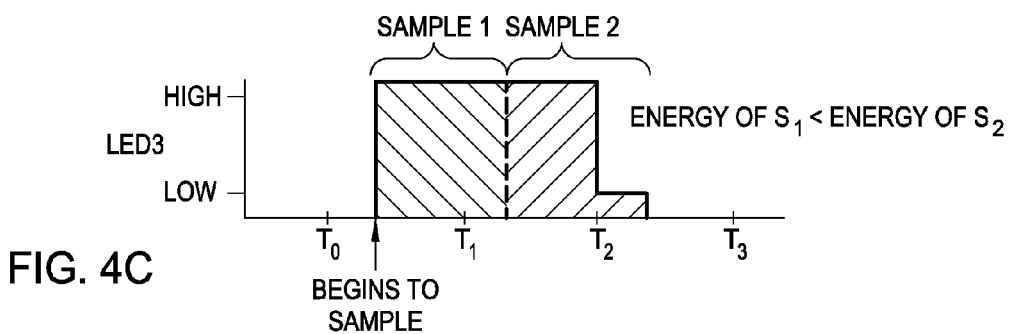
Figure 4D:
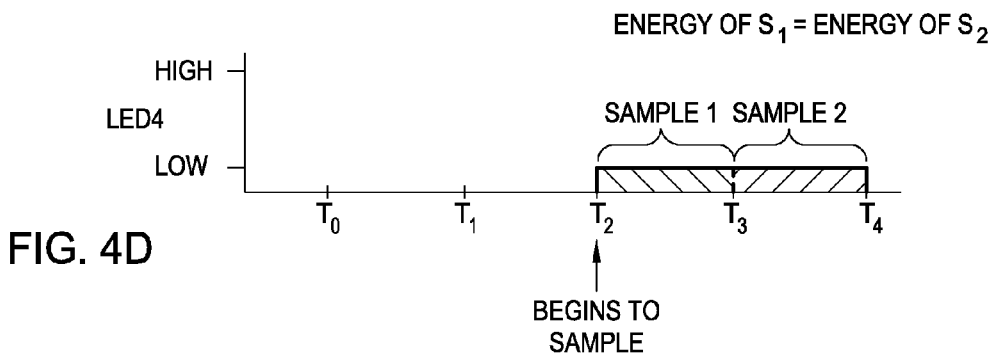

FIGS. 4B-4D illustrate a monitoring algorithm for synchronizing a receiving LED with a transmitting LED. Specifically, each receiving LED may sample, either constantly or at a set interval, light intensity at least two sequential periods that have the same length T. For example, the receiving LEDs may use the process disclosed in FIG. 3 to derive the intensity of the incident light during the two sequential time periods based on the changing capacitance in the LED. This measured intensity is what is shown in FIGS. 4B-4D.

In FIG. 4B, the clock associated with LED 2 is ahead of the clock of LED 1 by approximately a quarter of the time period T. Sample 1 begins when LED 1 is transmitting a logical 0 (i.e., low intensity), but at time $T_0$, LED 1 begins to transmit a logical 1 which increases the intensity measured at LED 2. Sample 2, on the other hand, measures only high intensity for the period T. The controller $110_2$ associated with LED 2 then compares the two samples. Because LED 2 received more light energy (i.e., the shaded areas) during Sample 2 than Sample 1, the controller $110_2$ begins to sample at a later time—i.e., shifts the clock to the right. Specifically, the controller $110_2$ may adjust the clock based on the different amount of light received during the samples. That is, the greater the difference, the greater the adjustment. Based on the sync pattern, the controller shifts its clock such that the two samples measure substantially the same amount of light, thereby indicating to the controller that its clock is now in sync with the clock associated with the transmitting light source.

In FIG. 4C, the clock associated with LED 3 is behind the clock of LED 1 by approximately a quarter of the time period T. Here, Sample 1 begins when LED 1 is transmitting a logical 1. However, at time $T_2$, LED 1 begins to transmit a logical 0. Thus, the amount of light received during Sample 1 is greater than the amount of light received during Sample 2. In this case, the algorithm requires the clock associated with LED 3 to sample earlier—i.e., shift the clock to the left.

Like in FIG. 4B, the controller $110_2$ may adjust the clock based on the different amount of light received during the sample. That is, the greater the difference, the greater the adjustment.

FIG. 4D illustrate a special situation where the amounts of light measured by the two samples are equal yet the clocks of LED 1 and 4 are out of phase by two periods T. This situation may also occur if no LED in the VLC system 100 is currently transmitting. For example, the low intensity measured in the two samples may be the result of ambient light.

Accordingly, the algorithm may include comparing the maximum intensity of the light measured during the two samples to ensure that at least one sample detected a logical 1 for at least some portion of the sample. For example, if the measured intensity in the two samples never exceeds a certain threshold, the controller may assume that its clock is off by two time periods T and adjust the clock accordingly. If after making this adjustment the maximum intensity of light in the two samples is still below the threshold, then no light source is currently transmitting a sync pattern.

In one embodiment, the transmitting LED (i.e., LED 1) repeats the synchronization pattern (e.g., "0110") multiple times. This permits the receiving LEDs to gradually shift the phase of the clocks at predefined intervals. Moreover, repeating the synchronization pattern may eliminate logic needed to determine how much to shift the phase of the clock in a single synchronization cycle. Accordingly, once a controller 110 determines to shift the clock to either sample earlier or later, it does it at predefined steps until the amount of light received during both sequential high-intensity samples is substantially equal.

In regards to the special case shown in FIG. 4D, repeating the synchronization process ensures the clocks are out of phase by two time periods rather than the case where no light source is transmitting a synchronization message.

Figure 5:
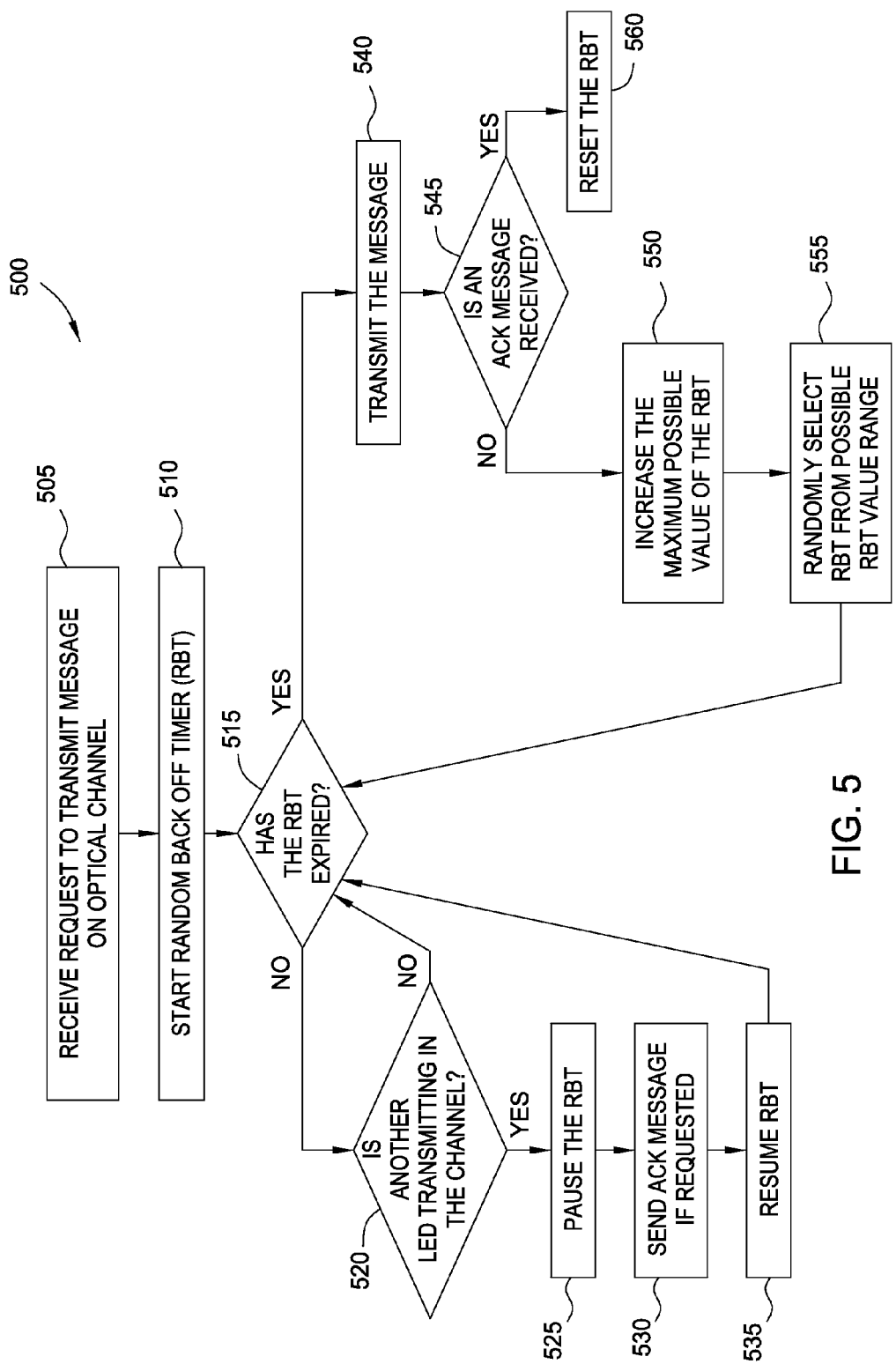
FIG. 5 is a method for ad hoc VLC between a plurality of LEDs, according to one embodiment described herein.

FIG. 5 is a method for performing VLC between a plurality of LEDs, according to one embodiment described herein. In one embodiment, the VLC system may be a decentralized, wireless ad hoc system which uses a method 500 for ensuring that each node (e.g., LED) receives an opportunity for transmitting a message on an optical channel.

At step 505, a controller determines a need to transmit a message using an attached light source. For example, the controller may be connected to an interactive toy which includes a button that when pushed, instructs an LED attached to the controller to transmit a message to a second toy. Alternatively, the controller may determine to send a message based on a message previously received from a different LED. Or the controller may include logic instructing it to constantly attempt to transmit a certain message to other LEDs in the same optical channel.

However, if two LEDs transmit a data message at the same time (i.e., in parallel) in the optical channel, a collision may occur which means at least one of the data messages was not received. Thus, the method 500 may use a random timer to provide a chance for each of the LEDs in the optical channel to transmit a message.

At step 510, an LED that desires to transmit a message in the optical channel starts a random back off timer (RBT). The RBT may be randomly selected from a uniform distribution with a range defined by minimum and maximum time values (e.g., 0-15 ms). Each LED may be associated with a different RBT even if two LEDs share the same controller.

At step 515, the controller determines if the RBT has expired. If not, at step 520, the controller monitors the optical channel to determine if another LED is transmitting a message. That is, the controller reverse biases the LED to turn it into a receiver. During this time, the controller determines whether a synchronization message is being transmitted.

For example, the controller may use the algorithm discussed in regards to FIGS. 4B-D where two sequential samples are taken, and the clock is adjusted by comparing the amount of light received in the two samples. However, if the two samples do not include a measurement corresponding to receiving a logical 1, the controller may determine that no LED is transmitting and return to step 515 to determine if the RBT has expired.

If the controller does detect a synchronization pattern, at step 525, it may pause the RBT while it receives the message. Each of the other LEDs that detect the synchronization pattern in the optical channel may also pause their respective RBTs.

After the clocks associated with the receiving LEDs are synchronized to the clock of the LED transmitting the message, the sender LED then transmits the rest of the data frame to the receiving LEDs.

At step 530, if the message was received correctly (i.e., the data was not corrupted) based on, for example, error correction bits included in the data frame, the receiving LED transmits an acknowledgment message ("ACK message") back to the sender LED. For example, the message may be unicast, and thus, only the intended receiving LED transmits the ACK message. However, even if multiple LEDs send an ACK message, because their clocks are synched, the multiple ACK message may appear to the sender LED as a single message.

At step 535, the LED that received the data frame resumes its associated RBT and returns to step 515 to determine if the timer has expired.

Once the timer expires, at step 540, the LED may begin to transmit a message (i.e., a data frame). As used herein, a "data frame" may include one or more sync patterns, a special frame delimiter (SFD), and a data payload, according to one embodiment. The data frame may also include a header and maintenance bits such error correction codes.

As discussed in regards to FIG. 4A-D, a LED attempting to transmit a message may first transmit one or more sync patterns to synchronize the clocks of the intended LED receivers. These sync patterns may make up a first portion of the data frame. In a second portion of the data frame that is between the sync patterns and the data payload, the LED may transmit a SFD which may be a defined sequence of logical ones and zeros that indicates to the receiving LEDs that the data frame is transitioning to the data payload (i.e., a third portion of the data frame).

The SFD may be useful when a receiving LED does not receive all of the sync patterns. For example, a LED may join while the first few sync patterns have already been transmitted, or its clock may have been out of phase by two periods T, and thus, did not detect the first sync pattern. In either situation, the LED may use the later sync patterns to synchronize its clock. Instead of counting the sync patterns, once the receiving LED detects the SFD, it knows to expect to receive the data payload found in a third portion of the data frame.

At step 545, the sender LED may be reversed bias and used as a receiver to determine if an ACK message is transmitted back to the LED that sent the data frame. The ACK message ensures that at least one of the LEDs in the optical channel received the data message.

If the ACK message is not received, at step 550, the sender LED and controller may assume that the message was corrupted when being transmitted to a LED (or no LEDs were in range). A collision may occur when, for example, RBTs for two separate LEDs expire at substantially the same time. Each LED may then begin to transmit its data frame. However, any receiving LED would likely be unable to distinguish between the two data frames being transmitted in parallel in the optical channel. Only after the sender LEDs failed to receive an ACK message would they identify a possible collision.

Because an ACK message was not received, the LED must again retransmit the message. However, before doing so, it may select a different value for the RBT. To decrease the likelihood that the two transmitting LEDs will again have RBTs that expire simultaneously and thus cause another collision, the range of possible values for the RBT may again be increased. Specifically, the maximum value of the range of the uniform distribution may be increased—e.g., increased from 0-15 ms to 0-31 ms. Further, each time a collision is detected, the range may be increased. However, after a certain number of attempts based on number RBT values, the packet may be dropped. Dropping the packet may be advantageous since there may not be any receiving LEDs currently in range.

If both of the transmitting LEDs that experienced the collision increase their ranges, it is more likely that the randomly selected RBT for each of these LEDs will have a different value. Moreover, as a VLC network grows and as collisions increase, using a greater range of possible values for the RBT decreases the chance of repeat collisions. Thus, an ad hoc VLC network can adapt to the number of LEDs attempting to transmit without ever determining how many LEDs are actually participating in the optical channel.

In one embodiment, the range of the RBTs may decrease if a controller does not detect a collision. For example, if the LED associated with the controller successfully transmits several messages without detecting a collision or, when monitoring the optical channel in step 520, does not detect another LED transmitting, the controller may decrease the range of possible values of the RBT. This may decrease the time between transmitted data messages in the optical channel and increase the data throughput.

At step 555, the controller randomly selects a RBT value from the increased range. In one embodiment, the range may be capped such that it cannot expand beyond a certain value.

The RBT timer is again started and the method 500 returns to step 515 to determine if the timer has expired.

If an ACK message is received, at step 560, the controller may restart the RBT timer using either the previous RBT value or randomly select a different value from the uniform distribution. Alternatively, in one embodiment, the controller may wait to reset the RBT until it determines that the LED should transmit a different data message.

In one embodiment, the transmitting LED may detect a collision while transmitting a data message at 540. A data message may comprise of a plurality of data packets where the ACK message is transmitted from the receiving LED after it has successfully received all of the data packets in the data message. However, if a collision occurs in the middle of transmitting the data message, the transmitting LED waste energy by continuing to transmit the rest of the data packets in the data message. Accordingly, between transmitting data packets, the transmitting LED may be reversed biased during a data interval to determine if another LED is transmitting light. If the transmitting LED determines that another LED is emitting light during the data interval (i.e., a collision), the transmitting LED may stop prematurely halt transmitting the data message and skip to step 550, reset the RBT, and attempt to re-transmit the data message as discussed above.

Preventing Flickering

Using visible light to transmit data may use frequencies which have an effect on humans viewing the light sources. The maximum luminance and the minimum refresh frequency observed by a human viewer can be predicted simply based on the lowest frequency of the baseband frequency of the baseband signal, called the critical flicker frequency (CFF). If the signal alternates between low and high intensity at frequencies higher than CFF, the observer does not perceive flicker.

Preventing flickering may not reliably be solved by merely using a frequency to transmit data that is above the CFF if the emitted light does not alternate between low and high intensity. For example, even if the data is transmitted at a frequency twice that of CFF, if the data message sends two or more consecutive logical zeros followed by two or more consecutive logical ones, the human eye may detect this change from low to high intensity. Thus, preventing flickering requires a VLC system to ensure that an LED never transmits consecutive periods of low or high intensity light that can be perceived by an observer.

Figure 6A:
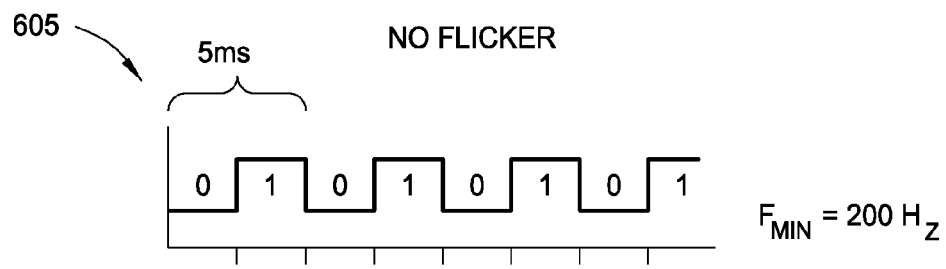
FIGS. 6A-6B illustrate transmitting data at a minimum frequency that may cause flickering, according to embodiments described herein.
Figure 6B:
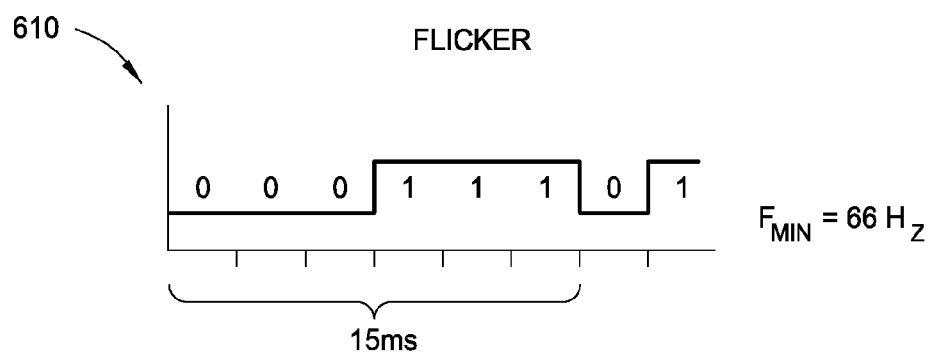

FIGS. 6A-6B illustrate transmitting data at a minimum frequency that may cause flickering, according to embodiments described herein. In FIG. 6A, the timing diagram 605 illustrates that data is transmitted at a rate of 200 Hz where two data symbols are transmitted during a 5 ms time period. Because the human eye cannot perceive change at this frequency, the observer sees only a constant average power that is between the high intensity and low intensity.

The timing diagram 610 of FIG. 6B also transmits data at a frequency of 200 HZ such that during every 5 ms two data symbols are transmitted. However, the data message introduces a minimum frequency ($F_{MIN}$) that has a 15 ms time period. This translates to a frequency of 66.7 Hz (1/15 ms) which may be perceived by the human eye. Instead of seeing a constant power, an observer would notice the change between low and high intensity. Thus, any time a light source transmits three consecutive bits of the same value, the user may notice a flicker. Note that the CFF may also depend on the intensity of the light. Thus, the CFF may be lower for a light that has less intensity than a light with a greater intensity.

In one embodiment, flickering is prevented by interleaving data intervals with energy intervals. During data intervals, a transmitting light source sends the data corresponding to a data frame—e.g., sync pattern, header, payload, SFD, and the like. During energy intervals, any light source in the VLC system may transmit either a high intensity or a low intensity to average out the energy that was transmitted (or not transmitted) in a data interval.

Figure 7A:
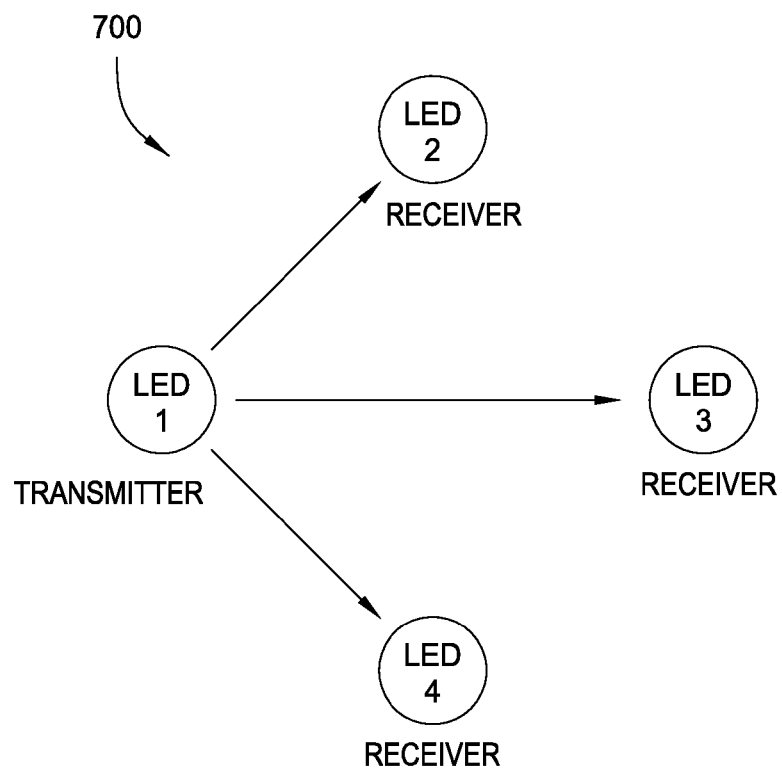
FIGS. 7A-7B illustrate VLC systems during data and energy intervals, according to embodiments described herein.
Figure 7B:
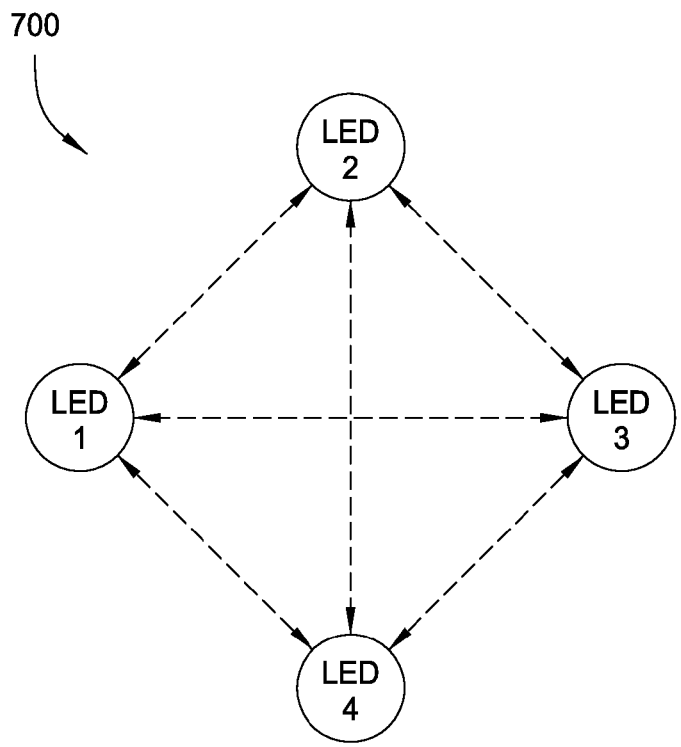

FIGS. 7A-7B illustrate VLC systems during data and energy intervals, according to embodiments described herein. FIG. 7A illustrates the state of the VLC system 700 during a data interval. As shown, only one LED per optical channel is permitted to transmit during the data interval. If more than one LED is transmitting during the data interval, a collision may occur.

LED 1 transmits a data bit during the data interval. If transmitting a logical 1, LED 1 may be forward biased. If transmitting a logical 0, LED 1 may either not emit any light or have a forward bias that is different from the forward bias applied when transmitting a logical 1. The receiving LEDs (i.e., LEDs 2-4) are reversed biased during the data interval in order to measure the intensity of light transmitted by LED 1. Based on the intensity of the light, the receiving LEDs determine which data bit was transmitted in the optical channel.

FIG. 7B illustrates the state of the VLC system 700 during an energy interval. During this interval, no data is transmitted in the optical channel. That is, if any receiver detects light during this interval, it is ignored. Instead of being used to transmit information, the energy interval may be used to compensate for the light emitted (or not emitted) during a data interval. The dotted lines represent that any of the LEDs may emit any portion of light needed to compensate for a data interval. For example, if LED 1 transmitted a logical 1 using high intensity light in the data interval, it may transmit low intensity light during the energy interval. Because a receiving LED does not transmit during a data interval, it may transmit high intensity light during the energy interval. Because the human eye may combine the output of one or more data intervals with the output of one or more energy interval, the eye sees only that each LED outputs a constant power that is an average of the two intervals.

Interleaving data intervals with energy intervals may be performed even when the VLC system 700 is idle and no LED is transmitting data during the data intervals. In this case, each LED in the system 100 may be reversed bias during the data intervals (to detect a synchronization pattern that indicates an LED wants to transmit a message) and forward biased during the energy intervals to compensate for the lack of luminance during the data interval.

Figure 8:
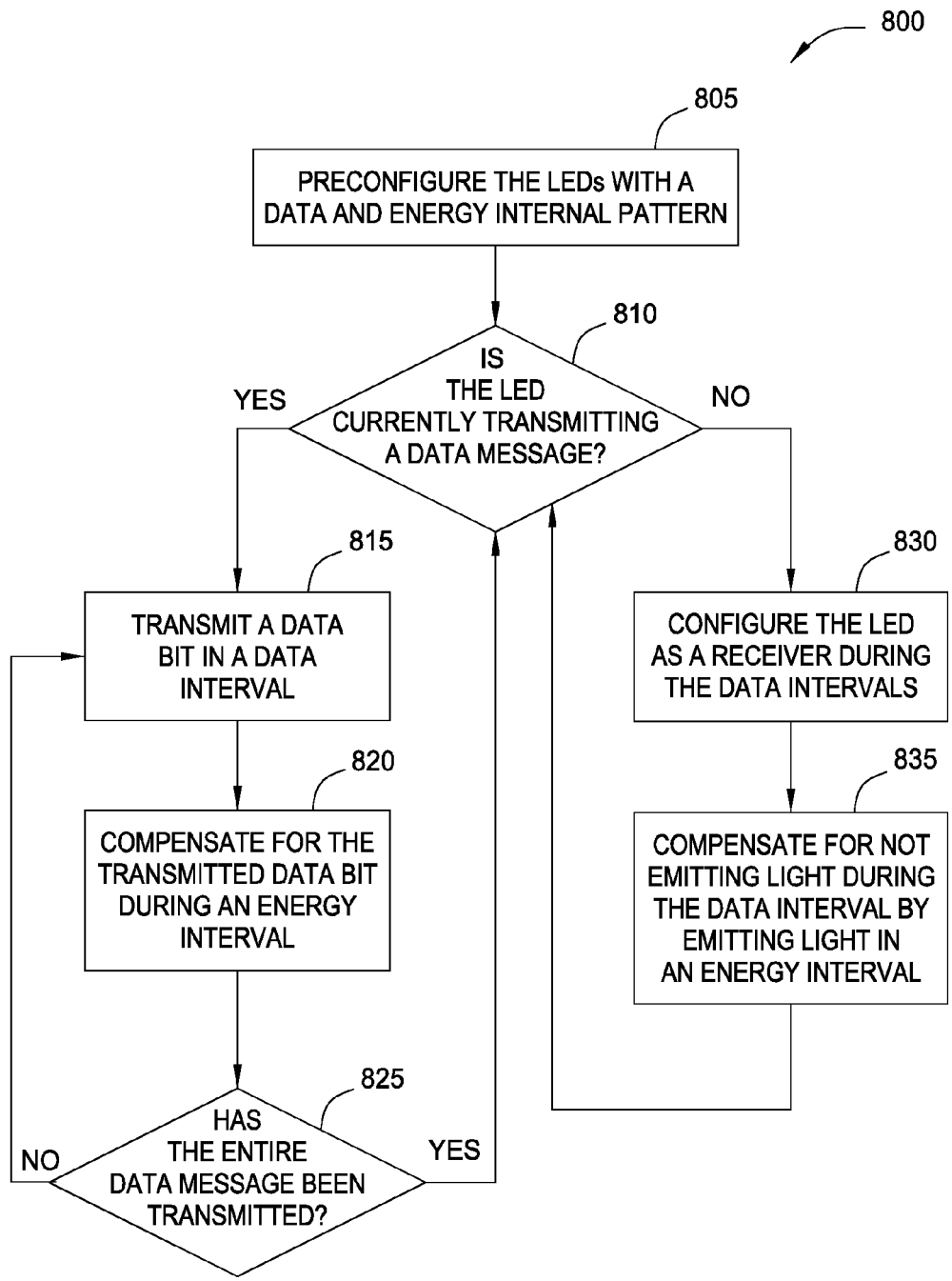
FIG. 8 is a method for preventing flickering in a VLC system, according to one embodiment described herein.

FIG. 8 is a method 800 for preventing flickering in a VLC system, according to one embodiment described herein. At step 805, the controllers associated with the LEDs in a VLC system are preconfigured with a particular data and energy interval pattern. Examples of these patterns will be discussed later.

At step 810, the LED determines whether it is currently transmitting a data message. For example, the RBT associated with the LED may have expired indicating that it now is able to transmit a data frame in the optical channel.

If the LED is transmitting data, at step 815, the LED transmits a data symbol of the data frame during a data interval. At step 820, the LED compensates for the light (or lack thereof) that was transmitted during the data interval. That is, if the LED transmitted high intensity light during the data interval, it may transmit low intensity light during the energy interval to produce an average power for the two intervals.

At step 825, if the LED has not transmitted the entire message, the method 800 returns to step 815 to transmit the next data symbol in the data frame until the entire data message has been transmitted. In one embodiment, the LED may transmit a plurality of sequential data symbol before using a plurality of energy intervals to compensate for the transmitted data symbols.

Once the message has been transmitted, the method 800 returns to step 810 to determine if the LED should transmit a second message.

If at step 810 the LED is not currently transmitting a message, at step 830, the controller reverse biases the LED to turn it into a receiver (or uses a different photodiode) during the data interval for detecting whether another LED in the VLC is transmitting data. Because a LED does not emit light when reverse biased, at step 835, the LED uses the energy interval to emit light to compensate for the lack of light during the data interval—i.e., the LED is forward biased.

Of course, if the LED is not supposed to transmit any light, the LED may continue to not emit light during the energy interval. For example, the controller may continue to apply a reverse bias across the LED during the energy interval. Alternatively, the controller may apply no bias across the LED during the energy interval to conserve power.

Figure 9A:
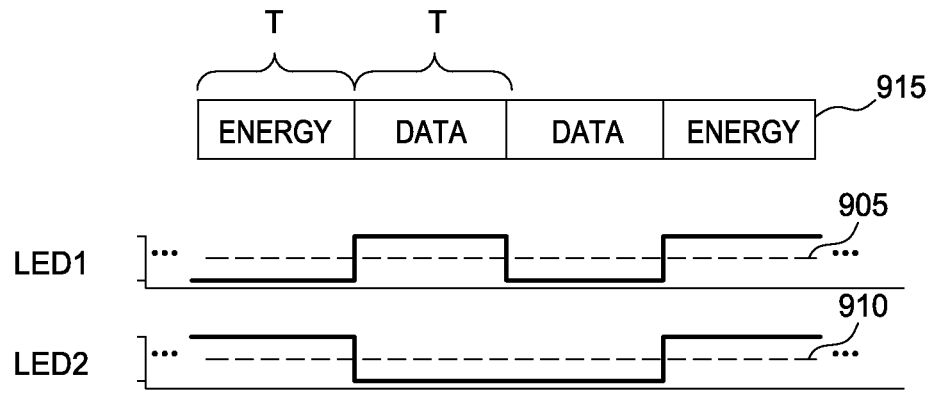
FIGS. 9A-9C are timing diagrams illustrating interleaved data and energy intervals, according to embodiments described herein.
Figure 9B:
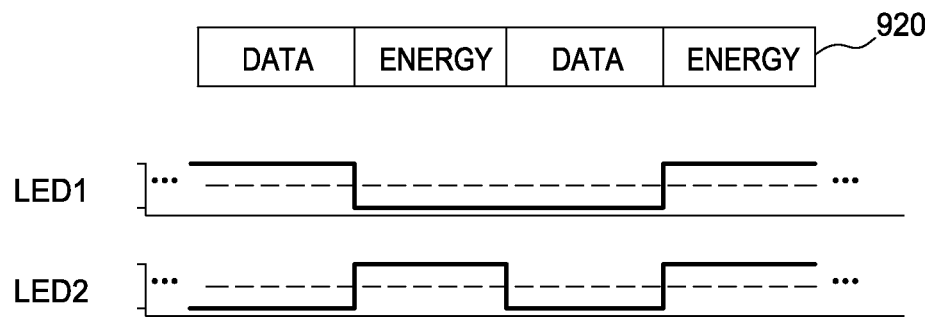
Figure 9C:
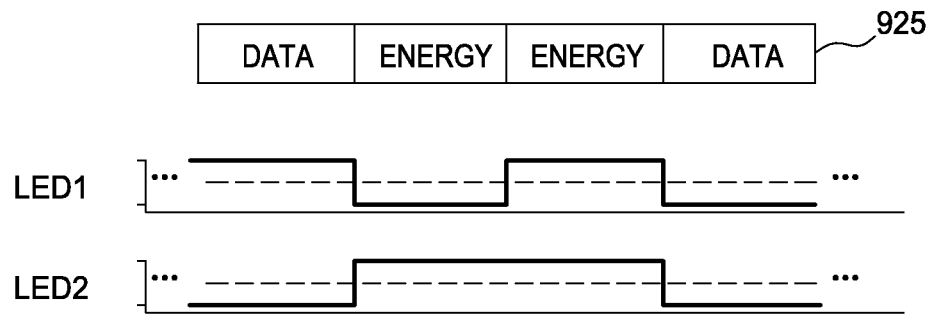

FIGS. 9A-9C are timing diagrams illustrating interleaved data and energy intervals, according to embodiments described herein. The VLC system 700 of FIGS. 7A-B is used as an illustration. Here, LED 1 transmits a logical 1 and 0 to LEDs 2-4. It is assumed that LEDs 2-4 are supposed to be on (i.e., emitting light at a constant power without flickering). If the LEDs 2-4 are off then they would simply remain reverse biased during the data intervals and have no bias during the energy intervals. Because LEDs 2-4 each act in an identical manner, only LED 2 is shown.

FIG. 9A illustrates a timing diagram where the two consecutive data intervals are sandwiched between two energy intervals ("EDDE"). Each LED in the VLC system may be preconfigured to know what interval pattern 915 to use. Moreover, this interval pattern 915 may continually repeat. Since LED 1 is transmitting a 1 and 0 in the two data intervals, one energy level is selected to average out the power from the first data interval while the other energy level is selected to average out the power from the second data interval. Thus, LED 1 transmits "0101".

Note that any ones or zeros transmitted by LED 1 in the energy intervals is not intended to be interpreted as data by the receiving LEDs. Indeed, during the energy intervals the receiving LEDs may not be reversed bias, and thus, are incapable of detecting the intensity of light transmitted by LED 1. Accordingly, any light transmitted by any LED in the energy interval is ignored by the other LEDs (or other receivers) in the VLC system.

Because LED 2 is receiving data, it may never emit light during data intervals when LED 1 is transmitting a message. For example, as shown by step 520 of FIG. 5, LED 2 may have been monitoring the optical channel when it detected that LED 1 had begun to transmit a data frame. During energy intervals, however, LED 2 is free to emit any intensity of light to ensure that it emits flicker-free light as perceived by a human being. In this case, LED 2 emits high intensity during the first and second energy intervals to counter the fact it is not emitting any light during the first and second data intervals.

Thus, in an embodiment where the number of data intervals equal the number of energy intervals, a LED receiving a data message may always transmit high intensity light during the energy intervals to compensate for not emitting any light during the data intervals. Based on this concept, LED 2 knows it should emit high intensity light during the first and second energy intervals because it will not emit light when it is reversed bias during the data intervals—i.e., "1001". In this manner, the receiving LEDs may produce light with a constant luminance according to a human observer.

Lines 905 and 910 represent a predefined average (or constant) intensity that is perceived by an observer of the VLC system. The average intensity 905 for the transmitting LED may be same or different from the average intensity 910 for the receiving LED. However, if a LED may both transmit and receive messages while being activated (i.e., illuminated), then the average intensities 905, 910 may be the same to prevent the intensity from changing when the LED changes modes from transmitting to receiving.

The average intensity 905 is determined based on the intensity difference between a logical 1 and 0. That is, to increase the average intensity 905 perceived by an observer, the high intensity level or the low intensity level (or both) may be increased.

The average intensity 910 is determined based on the average between the high intensity in the energy interval and the low intensity in the data interval. Because receiving LEDs cannot transmit when reverse biased, they can increase the average intensity 910 only by increasing the intensity emitted during the energy intervals.

In one embodiment, to ensure no flickering, the chosen interval pattern 915 does not have one or a plurality of sequential data intervals that add up to a total time greater than 10-15 ms. Stated differently, the maximum time period for transmitting a single data symbol or plurality of sequential data symbols is 10-15 ms. This ensures that even if a plurality of sequential data intervals transmit the same data symbol, the minimum frequency is greater than approximately 66-100 Hz.

However, if using the internal capacitance to measure the intensity of the received light as shown in FIG. 3, the maximum time period for transmitting a single data symbol or plurality of sequential data symbols may be 2-3 ms. This is because a larger time period, i.e., 10-15 ms, may cause the internal capacitance to discharge completely which would mean the slope can no longer be detected. That is, the slope would be zero no matter the amount of light hitting the reverse biased diode.

In one embodiment, the EDDE interval pattern 915 may be used because it corresponds to the sync pattern discussed in FIGS. 4A-D "0110"). For example, the data frame may repeat "11" as the sync pattern. When the EDDE interval pattern 915 is combined with transmitting the two consecutive logical ones of the sync pattern, the result is "0110". Thus, the transmitting LED transmits "0110" for every occurrence of "11" in the data frame. The receiving LED then creates the two samples (during its two reverse biased data intervals in the EDDE pattern 915) and uses these samples to determine the phase shift for its clock.

Moreover, the interval patterns shown in FIGS. 9A-9C may be repeated when a data message is being transmitted in the optical channel and when the optical channel is idle. In this manner, an observer perceives the same constant power when data is, or is not, being transmitted in the optical channel.

FIG. 9B illustrates using a DEDE interval pattern 920. Here, the LED 1 transmits the logical 1 and 0 in the respective first and second data intervals that are interleaved by energy intervals. Like in FIG. 9A, the first energy interval may compensate for the light transmitted in the first data interval while the second energy interval compensates for the light transmitted in the second data interval.

LED 2 would follow the same pattern explained in FIG. 9A. It is reversed biased during the data intervals and forward biased to emit high intensity light during the energy intervals.

FIG. 9C illustrates using a DEED interval pattern 925. Here, the LED 1 transmits the logical 1 and 0 in the respective first and second data intervals that are interleaved by two consecutive energy intervals. Like in FIG. 9A, the first energy interval may compensate for the light transmitted in the first data interval while the second energy interval compensates for the light transmitted in the second data interval.

LED 2 would follow the same pattern explained in FIG. 9A. It is reversed biased during the data intervals and forward biased to emit high intensity light during the energy intervals.

Moreover, based on the different interval patterns 920, 925 shown in FIGS. 9B and 9C, the LEDs in the VLC system may use a different sync pattern and/or algorithm for synchronizing the clocks than the one shown in FIGS. 4A-D.

Although the embodiments shown in FIGS. 9A-C allow at most two consecutive periods with the same intensity (e.g., transmitting at most two sequential logical ones or zeros), this is not a requirement. If the time periods are shrunk—i.e., the data symbols of a data frame are transmitted at a higher frequency—the VLC system could transmit more consecutive data intervals. For example, the pattern could be EED-DDDEE where even if the LED transmits all zeros or ones during the consecutive data intervals, the combined time of the four data intervals would be less than the 10-15 ms maximum, thereby preventing flickering.

In one embodiment, using predefined interval patterns 915, 920, 925 permit the VLC system to synchronize the clock of a new LED that is added to the system before transmitting one or more sync patterns in a data message. Because each of the LEDs may be configured to use the same interval pattern, when already synchronized LEDs are activated but not currently transmitting data message (as shown by LED 2 in FIGS. 9A-C) they emit high intensity light during the energy intervals and no light when they are reversed biased during data intervals. This pattern continues as the LEDs in the VLC system wait for an LED to transmit a message. Thus, a LED that comes into range of these synchronized LEDs detects this repeating pattern, for example, for the interval pattern EDDE, the repeating pattern is " . . . 100110011001 . . . ."

The new LED may use the synchronization method discussed in FIGS. 4A-D to align its clock to the two sequential periods of high intensity that are transmitted in the sequential energy intervals as this example pattern repeats. The controller for the new LED may then determine how many times the "1001" pattern is repeated. If it repeats more than the predefined number of sync patterns that are transmitted before a data message, then the new LED determines that the two sequential periods actually correspond to the energy intervals rather than the data intervals shown in FIGS. 4B-D. That is, the controller determines that the periods of low intensity are actually data intervals while the periods of high intensity are the energy intervals. In this manner, the clock of a new LED may be synchronized to LEDs that are not currently transmitting a sync pattern for transmitting a data message. A similar process may be followed if the other pattern intervals 920, 925 are used.

EXAMPLE

Light sources in a VLC system may be divided into sources, sinks, and carriers. Sources (e.g., transmitters) act as permanent or temporary message sources in the VLC network. Sources may send messages continuously or based upon interaction by a user. As an example of the latter, a source LED may be located on a toy that attempts to transmit a message to other LEDs in the VLC upon receiving a command from the user (e.g., the user presses a button communicatively coupled to the LED's controller).

A sink (e.g., a receiver) is a passive element in the VLC network that does not send messages other than ACK messages to an element that transmit a data message. The sinks react upon reception of all messages or only certain messages.

In one embodiment, the sink may be an reversed biased LED that waits to receive a particular message from a source LED. Once it receives the message, the LED activates (emits light) and may perform the flickering prevention method discussed above.

In another embodiment, the sink may be a music box with a photodiode that receives the message from the source and responds by playing music. Alternatively, the sink may be a reversed biased LED, but instead of activating when the message is received, the controller sends a message to the music box to play the music.

A carrier (e.g., a transceiver) is a VLC element that is capable of both sending and receiving VLC messages. Depending on the type and content of the received data messages, a carrier may trigger certain actions such as playback of a song. Additionally, the carrier can transmit a message of its own to initiate bi-directional communication with another carrier or sink. For example, a carrier may transmit a message for a certain period of time (i.e., acts like a source) and then waits until a reply message is returned (i.e., acts like a sink). In this manner, depending on the particular task being performed at that instant, the carrier may either be a transmitter or a receiver.

Figure 10A:
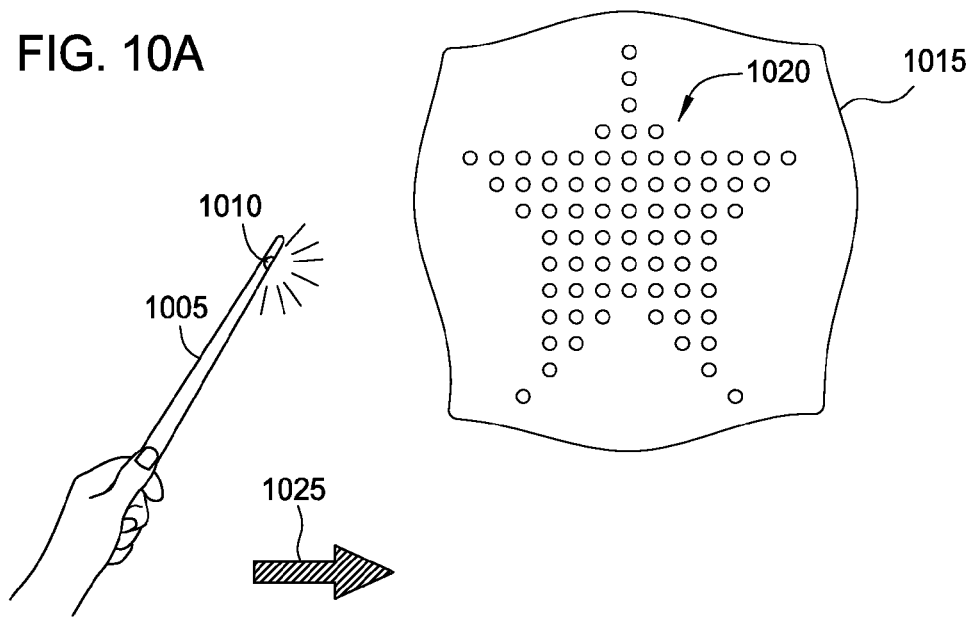
FIGS. 10A-10B illustrate two devices using light sources in a VLC system to communicate, according to embodiments disclosed herein.
Figure 10B:
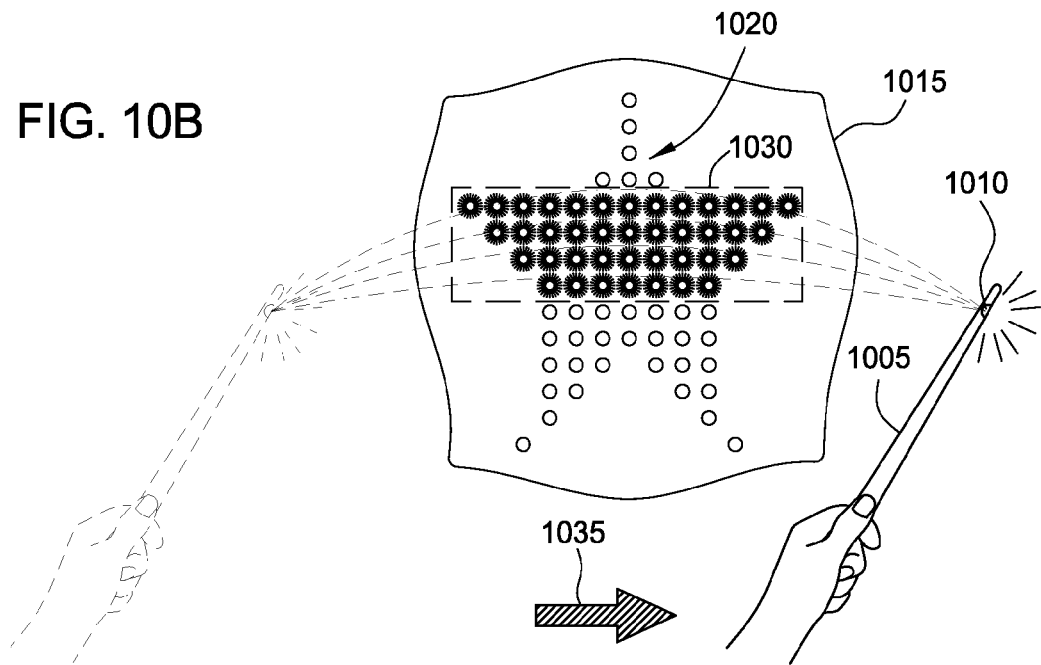

FIGS. 10A-10B illustrate two objects using light sources in a VLC system to communicate, according to embodiments disclosed herein. As shown in FIG. 10A, the transmitting object 1005 may include a source LED 1010 which is configured to transmit a message to the LEDs in the LED array 1020 located on a receiving object 1015. For example, the user may activate a button on the object 1005 which starts a RBT time associated with the source LED 1010. Once the timer expires, the source LED 1010 turns on and transmits a message to the LED array 1020 using the flicker prevention method discussed above.

Arrow 1025 illustrates the user moving the object 1005 in proximity to the receiving object 1015 such that the LED array 1020 is within the transmission range of the LED 1010.

FIG. 10B illustrate the result after the object 1005 passes over the object 1015 (as shown by arrow 1035). The portion of LEDs shown in box 1030 received the data message transmitted by the source LED 1010. Based on the received message, the controller or controllers associated with the LEDs in box 1030 activate the LEDs to emit light without flicker.

In one embodiment, the user may activate a different button on the object 1005 that instructs LED 1010 to transmit a data message that when received by an illuminated LED in box 1030 turns off the LED.

In one embodiment, the LEDs in the array 1020 may be sink LEDs that cannot communicate with LED 1010. However, in another embodiment, the LEDs in the array 1020 as well as LED 1010 may be carrier LEDs which are capable of bi-directional communication. For example, the LEDs in array 1020 and their controllers may be interconnected such that when the user activates all the LEDs in the array 1020, the controllers instruct the LEDs in the array 1020 to transmit a data message back to LED 1010. Once the object 1005 receives this data message it, may play music to indicate to the user that all the lights in the array 1020 were illuminated.

The objects 1005 and 1015 may be electronic devices, garments (with the LEDs and associated controllers sewn into the fabric), toys, and the like.

CONCLUSION

LEDs that either transmit or receive data in a VLC may create a flickering effect. Flickering is observed when the human eye is able to perceive the fluctuations in intensity of the light emitted by the LED. The intensity of the light may change because the LED is transmitting a message or because the LED switches between reverse and forward bias.

To prevent flickering, the LEDs may emit light based on a pattern of data and energy intervals. During the data intervals, a LED transmitting a message sends one or more data symbols to receiving LEDs. During this interval, the receiving LEDs are reversed bias, and thus, are not emitting light. During the energy intervals, however, any LED in the VLC system may emit light. Each LED uses the energy interval to compensate for the light transmitted (or not transmitted) during the data interval. For example, a transmitting LED that emitted light at a high intensity during a data interval may transmit low intensity light during an energy interval. A receiving LED, however, does not transmit light during the data interval, and thus, may transmit high intensity light during the energy interval. So long as the time period for the data and energy intervals is too short for the human eye to see the changing intensity, an observer perceives that both the transmitting and receiving LEDs are transmitting light with a constant intensity or luminance.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   selecting at least one first intensity level of a light source for transmitting a single data symbol to a receiver during a data interval;
   selecting at least one second, different intensity level of the light source based upon the first intensity level to achieve a perceived average intensity level; and
   emitting the first intensity level from the light source during the data interval and emitting the second intensity level from the light source during an energy interval to achieve the perceived average intensity level, wherein a receiver is configured to ignore the second intensity level emitted during the energy interval,
   wherein respective time periods of both the data and energy intervals are set to mitigate an ability of a human eye to detect a change from the first intensity level emitted in the data interval to the second intensity level emitted in the energy interval.

2. The method of claim 1, wherein the data and energy intervals are included in an interval pattern, further comprising, repeating the interval pattern to maintain the perceived average intensity level.

3. The method of claim 1, wherein the light source is a light-emitting diode (LED).

4. The method of claim 1, wherein the receiver is a LED, and wherein the receiver does not emit light during the data interval, further comprising:
   selecting a third intensity level of the receiver to achieve a different perceived average intensity level during the data and energy intervals; and
   emitting the third intensity level from the receiver during the energy interval.

5. The method of claim 1, further comprising, synchronizing a clock associated with the receiver to a clock associated with the light source using a first portion of a data frame, wherein the first portion is transmitted before a second portion of the data frame that contains a data payload.

6. The method of claim 1, further comprising, before transmitting a data frame from the light source to the receiver:
   randomly selecting a value for a timer from a range of values; and
   upon determining that the timer has expired, transmitting the data frame.

7. The method of claim 6, wherein the light source is a LED, further comprising, after starting the timer and before the timer has expired:
   reverse biasing the light source to determine if a different data frame is being transmitted;
   upon determining that a different data frame is being transmitted, pausing the timer; and
   after receiving the different data frame, resuming the timer.

8. The method of claim 1, wherein the light source is configured to transmit a data message that includes at least two data packets, further comprising:
   after transmitting at least one of the data packets, detecting whether a different light source is emitting light during the data interval, wherein, upon determining that the light being emitted by the different light source is greater than a threshold, not transmitting at least one of the data packets in the data message.

9. The method of claim 1, wherein the receiver is a LED, further comprising transmitting a different data symbol from the receiver to the light source by forward biasing the receiver during a different data interval.

10. The method of claim 1, further comprising, transmitting respective data symbols during at least two sequential data intervals, wherein a combined time period of the at least two sequential data intervals is less than 15 ms.

11. A system, comprising:
    a light source; and
    a controller coupled to the light source, the controller configured to select at least one first intensity level of a light source for transmitting a single data symbol to a receiver during a data interval, the controller configured to select at least one second, different intensity level of the light source based upon the first intensity level to achieve a perceived average intensity level,
    wherein the light source is configured to emit the first intensity level during the data interval and emit the second intensity level during an energy interval to achieve the perceived average intensity level, wherein the receiver ignores the second intensity level emitted during the energy interval, and wherein respective time periods of both the data and energy intervals are set to mitigate an ability of a human eye to detect a change from the first intensity level emitted in the data interval to the second intensity level emitted in the energy interval.

12. The system of claim 11, wherein the data and energy intervals are included in an interval pattern, wherein the light source is configured to repeat the interval pattern to maintain the average intensity level.

13. The system of claim 11, wherein a combined time period for at least one data interval and at least one sequential energy interval is less than 15 ms.

14. The system of claim 11, wherein the receiver is a LED, wherein the receiver does not emit light during the data interval, and wherein the receiver emits a third intensity level during the energy interval to achieve a different perceived average intensity level for the energy and data intervals.

15. The system of claim 11, wherein the light source is configured to transmit a first portion of a data frame that synchronizes a clock associated with the receiver to a clock associated with the light source, wherein the first portion is transmitted before a second portion of the data frame that contains a data payload.

16. The system of claim 11, wherein the controller is configured to transmit a data message that includes at least two data packets using the light source, wherein, after transmitting at least one of the data packets, the controller is configured to determine whether a different light source is emitting light during the data interval and, upon determining that the light being emitted by the different light source is greater than a threshold, not transmit at least one of the data packets in the data message.

17. The system of claim 11, further comprising a different controller associated with the receiver, wherein the receiver is a LED, wherein the different controller forward biases the receiver to transmit a different data symbol from the receiver to the light source during a different data interval.

18. A system, comprising:

a light source, wherein the light source is a LED; and a controller coupled to the light source, the controller configured to select a first intensity level of a light source for transmitting a data symbol to a receiver during a data interval, the controller configured to select a second, different intensity level of the light source based upon the first intensity level to achieve a perceived average intensity level, wherein the light source is configured to emit the first intensity level during the data interval and emit the second intensity level during an energy interval to achieve the perceived average intensity level, wherein the receiver ignores the second intensity level emitted during the energy interval, and wherein respective time periods of both the data and energy intervals are set to mitigate an ability of a human eye to detect a change from the first intensity level emitted in the data interval to the second intensity level emitted in the energy interval, wherein, before transmitting a data frame from the light source to the receiver, the controller is configured to randomly select a value for a timer from a range of values and, upon determining that the timer has expired, the light source is configured to transmit the data frame wherein, after starting the timer and before the timer has expired, the controller is configured to reverse bias the light source to determine if a different data frame is being transmitted and, upon determining that a different data frame is being transmitted, the controller is configured to pause the timer, wherein, after receiving the different data frame, the controller is configured to resume the timer.

19. A method, comprising:

establishing an optical communication channel between a first semiconductor light source and a second semiconductor light source according to a predetermined interval pattern comprising at least one data interval and at least energy interval;

detecting incident light by reverse biasing the first semiconductor light source during the data interval to detect a single data symbol;

selecting an intensity level of the first semiconductor light source to achieve a perceived average intensity level, wherein the perceived average intensity level is an average of the light emitted by the first semiconductor light source during the data and energy intervals; and emitting the intensity level by forward biasing the first semiconductor light source during the energy interval to achieve the perceived average intensity level; and repeating the predefined interval pattern to maintain the perceived average intensity level, wherein respective time periods of both the data and energy intervals are set to mitigate an ability of a human eye to detect a change from the first intensity level emitted in the data interval to the second intensity level emitted in the energy interval.

20. The method of claim 1, further comprising, for each data symbol in a data frame comprising a plurality of data symbols:

selecting at least one third intensity level of the light source for transmitting a respective data symbol to the receiver during a respective data interval; and selecting at least one fourth intensity level of the light source different from the at least one third intensity level based upon the first intensity level to achieve a perceived average intensity level; and emitting the third intensity level from the light source during the data interval and emitting the fourth intensity level from the light source during a respective energy interval to achieve the perceived average intensity level.

* * * * *